Jan. 3, 1967  J. E. BARRY, SR  3,295,217

GAUGING FIXTURE FOR STEPPED MICROMETER GAUGE

Filed Sept. 20, 1963  2 Sheets-Sheet 1

INVENTOR.
JAMES E. BARRY SR.

BY Brumbaugh, Free,
Graves & Donohue his ATTORNEYS

Jan. 3, 1967   J. E. BARRY, SR   3,295,217
GAUGING FIXTURE FOR STEPPED MICROMETER GAUGE
Filed Sept. 20, 1963   2 Sheets-Sheet 2

INVENTOR.
JAMES E. BARRY SR.
BY Brumbaugh, Free,
Graves & Donohue
his ATTORNEYS

United States Patent Office 3,295,217
Patented Jan. 3, 1967

3,295,217
GAUGING FIXTURE FOR STEPPED
MICROMETER GAUGE
James E. Barry, Sr., 170 Winnekee Ave.,
Poughkeepsie, N.Y. 12601
Filed Sept. 20, 1963, Ser. No. 310,260
13 Claims. (Cl. 33—170)

This invention relates to a fixture for a micrometer gauge having on its measuring screw a plurality of projecting lands or "steps" spaced one inch apart along the screw to permit the "inches" measurement to be directly taken from one of the steps. More particularly, this invention relates to a fixture of such sort which is itself a supplemental gauge providing the "tenths of an inch" measurement, whereby such measurement need not be obtained by rotation of the screw of the micrometer gauge.

For a better understanding of the invention, reference is made to the following description of an exemplary embodiment thereof and to the accompanying drawings wherein.

Figure 3:
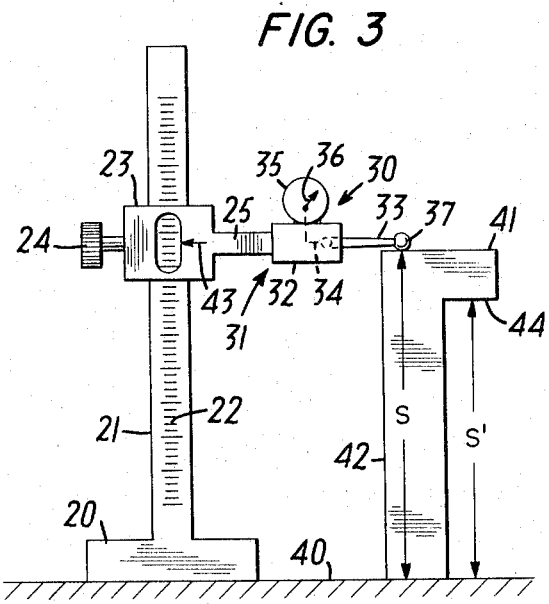
FIG. 3 is a schematic side elevation of a sliding height gauge with which the FIG. 1 fixture is used.

Considering FIG. 3, the sliding height gauge shown therein is made by the Browne and Sharpe Mfg. Co., Providence, R.I., and is comprised of: (a) a base 20, (b) a post 21 upstanding from the base 20, (c) a vertical scale 22 on the post, (d) a slide 23 movable up and down on the post along the scale, (e) a clamp 24 to lock the slide in a selected position on the post, and (f) a horizontal support arm 25 carried by the slide. A sliding height gauge of similar type is shown in U.S. Patent 2,429,923, granted Oct. 28, 1947, in the name of Cavicchi.

Another component of the FIG. 3 gauge is a sensing device 30 made by the Standard Gauging Co. under the trade name "Checkmaster." Device 30 is comprised of: (g) a mounting frame 31 supported by arm 25 and having a pair of horizontally spaced side plates 32 (only one shown), (h) a stem 33 having a rear end horizontally disposed between such plates and connected to each thereof through a horizontal pin shaft 34, (i) a dial 35 on frame 31 and having a needle 36 linked to stem 33 so as to indicate when the stem is level, and (j) a sensing ball 37 of 0.125" diameter carried by stem 33 at the front end thereof. The connection of stem 33 through shaft 34 to side plates 32 is such that the stem is normally held stationary by friction but can be vertically pivoted about the axis of the shaft by upward or downward pressure on ball 37.

In a direct measurement of the height $s$ from the ground plane 40 to the top surface 41 of an element to be gauged such as the shown workpiece 42, the slide 23 of the FIG. 3 gauge is moved downward on post 21 until ball 37 contacts surface 41 and needle 36 indicates that stem 33 is level. The slide is then clamped in position by clamp 24, and the height $s$ is read off scale 22 at a marker 43 on the slide. A reverse measurement may be taken of, say, the height $s'$ from plane 40 of an undersurface 44 of piece 42 by relocating the FIG. 3 gauge to place ball 37 under surface 44, moving slide 23 up until ball 37 contacts such surface and stem 33 is level, clamping slide 23 and again taking a reading on scale 22.

Often the scale 22 does not provide a sufficiently accurate reading of the measured height. In such instances, the aforedescribed procedure (omitting the reading step) is used in a direct measurement merely to bring the bottom of ball 37 to the same height above plane 40 as the surface being measured (stem 33 being level), and the bottom of ball 37 above such plane is then measured accurately by the stepped micrometer gauge shown in FIG. 2. If a reverse measurement is involved, the top rather than the bottom of the ball is brought to the same height as the surface being measured. The last-named gauge is made by the Cadillac Gauge Co., Detroit, Mich., under the trade name "Pla-Chek." Similar gauges are shown in U.S. Patent 2,440,710, granted May 4, 1948, in the name of R. E. Bauer, and U.S. Patent 2,544,004, granted Mar. 6, 1961, in the name of C. H. Bauer.

Figure 2:
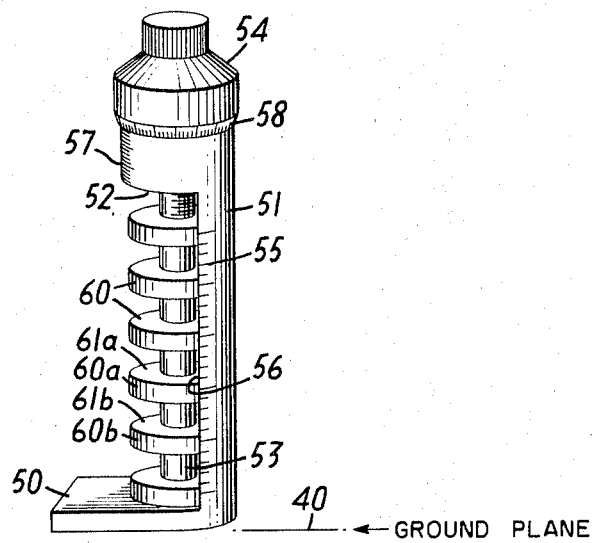
FIG. 2 is a schematic side elevation of a stepped micrometer gauge with which the FIG. 1 fixture is used.

In structure, the FIG. 2 gauge is comprised of: (a) a base 50, (b) a vertical column 51 upstanding from the base and a semi-annular horizontal cross section, (c) a tube 52 supported above base 50 by column 51, (d) a vertical micrometer screw 53 having a bottom portion threadedly received in a tapped hole (not shown) in base 50 and a smooth-surfaced top portion (not shown) journaled in tube 52 and projecting upwardly beyond the tube, (e) a rotatable micrometer head 54 affixed to the upper end of the screw, (f) a vertical scale 55 on the column (shown in FIG. 2 as being on the side of the column but there ordinarily being one such scale on each of the front faces 56 of the column), (g) a vertical scale 57 on the tube 52, and (h) a horizontal scale 58 on the head 54. As shown, the screw 53 carries a plurality of axially spaced steps or lands 60 which rotate with and vertically move with the screw, two adjacent ones of those lands 60 being designated in FIG. 2 as lands 60a and 60b. All of the lands 60 are so machined that the height from the top surface of each land to the top surface of the land next above is one inch to an accuracy of 0.0001 inch.

In the FIG. 2 gauge the vertical scale 55 on column 51 is calibrated in inches and tenths of an inch but is ordinarily used only for reading off inches. The other vertical scale 57 on tube 52 is comprised of large marks spaced by one-tenth inch and of small marks intervening the large marks so as to subdivide the scale into increments of 1/40 or 0.025 inch. One full rotation of head 54 moves screw 53 vertically by 1/40 inch, and the horizontal scale 58 around the head has twenty-five major divisions which are in turn subdivided. Thus, the FIG. 2 gauge can without difficulty be read to the nearest thousandth of an inch.

In connection with the foregoing, neither the FIG. 3 gauge nor the FIG. 2 is part of the present invention except insofar as the fixture of the present invention is adapted to be utilized with such gauges. The foregoing description of the FIG. 2 and FIG. 3 gauges is, however, believed desirable in that it leads to a better understanding of the invention.

To explain now how the gauges of FIG. 2 and FIG. 3 were used together in accordance with the practice of the prior art, assume that the FIG. 3 gauge has recorded the height $s$ of the piece 42 and that such height is, in fact, 3.444 inches. Assume further that land 60b of the FIG. 2 micrometer gauge is the "three inch" land and that the micrometer screw 53 has previously been set so that the top surface 61b of land 60b is initially at a height of 3.000 inches above ground plane 40. To transfer the measurement of height $s$ from the FIG. 3 gauge to the FIG. 2 gauge, the FIG. 3 gauge is moved over the ground plane to a position at which the ball 37 of the FIG. 3 gauge is inserted between two lands 60 of the FIG. 2 gauge, such lands (in the considered example) being the lands 60a and 60b. As is evident, the land 60b will be below the ball 37.

Next, the micrometer head 54 is rotated to turn the screw 53 and the lands 60 thereon in the direction which produces vertical upward movement of both the screw and the lands. Such rotation of the head is continued until the top surface 61b of land 60b advances upwards far enough to contact ball 37 of the FIG. 3 gauge and to then raise the ball (if necessary) until the needle 36 on dial 35 (FIG. 2) indicates that the ball stem 33 is level. Upon attaining such indication, the rotation of head 54 is stopped and the FIG. 2 gauge is read, the reading for inches being taken from scale 55, the reading for tenths of an inch and for units of 0.025 inch being taken from scale 57, and the reading to the closest thousandths of an inch being taken from scale 58. In accordance with what has been assumed, such reading will be 3.444 inch. In the course of making such reading, the height of the top surface 61b of land 60b from ground plane 40 has been increased from 3.000 inches to 3.444 inches, and to produce this increase of 0.444 inch it has been necessary to turn head 54 through seventeen full rotations and a fraction of another.

A disadvantage of the practice just described is that it is time consuming and inefficient because of the often-arising necessity of rotating the micrometer head 54 through a large number of turns (sometimes as many as forty) in order to obtain a reading of the height recorded by the FIG. 2 gauge. Another disadvantage of such practice is that a special "reverse bar" must be used in conjunction with the FIG. 2 gauge to obtain a reverse height measurement such as that performed to obtain the height s' (shown in FIG. 3) between an undersurface 44 and the ground plane 40.

Figure 4:
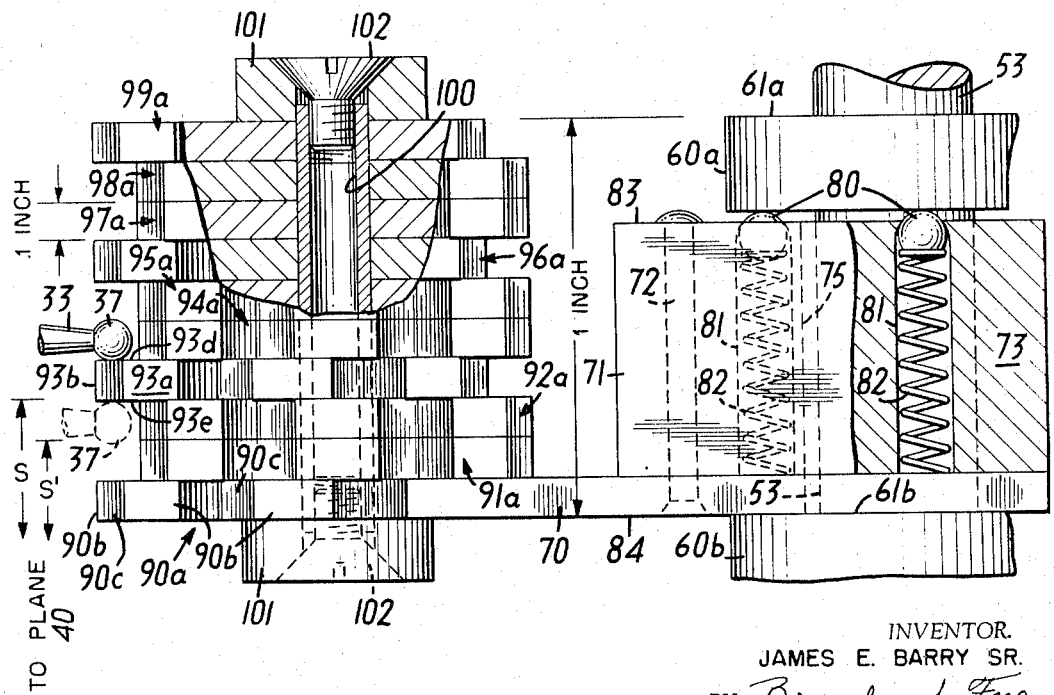
FIG. 4 is an enlarged side elevation of the FIG. 1 fixture when inserted between the gauge of FIG. 2 and that of FIG. 3.

It is accordingly an object of my invention to obviate one or the other or both of the above-noted disadvantages. Such object and other objects are realized in accordance with the invention by providing a special gauging fixture adapted to be interposed between the FIG. 2 and FIG. 3 gauges and to provide independently of the FIG. 2 gauge an accurate tenths of an inch height reading, wherefore no more than a few turns of the micrometer head 54 are required in order to make a measurement by the FIG. 2 gauge. As a feature according to the invention the fixture may be so constructed that it permits a reverse height measurement to be made as easily as a direct one. An exemplary embodiment of such a fixture is shown in FIGS. 1 and 4 to which reference is now made.

Figure 1:
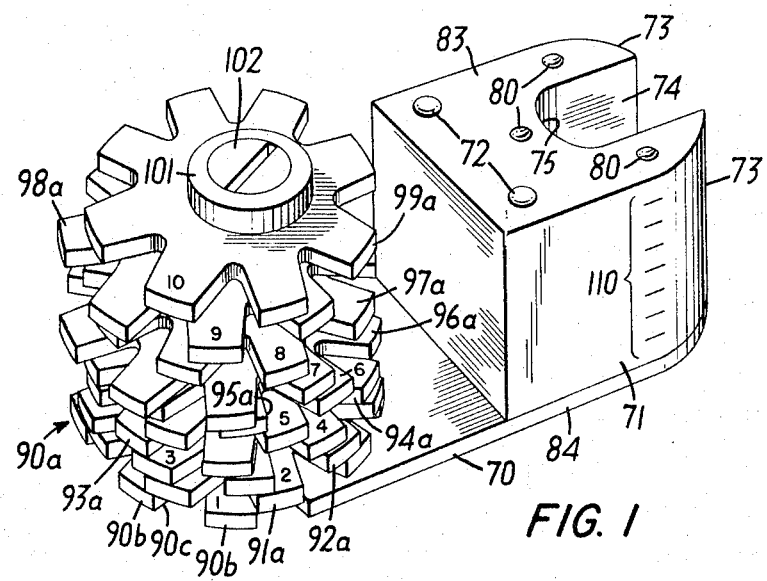
FIG. 1 is an isometric view of a representative fixture in accordance with the invention.

The FIG. 1 fixture comprises a steel base plate 70 lapped with an accuracy to the sixth decimal place to be 0.10000 inch thickness between its top and bottom faces which are optically flat. Affixed to the front end of plate 70 by a pair of rivets 72 is a mounting block 71 on top of the plate. As shown, the front ends of the plate 70 and the block 71 are each bifurcated to form a pair of jaws 73 on opposite sides of a socket grove 74 having at its rear a semi-cylindrical seating surface 75 and extending forward with constant width from seat 75 to a groove opening of rectangular cross section at the front of the fixture. The diameter of the semi-cylindrical face 75 and the groove width are of a size to receive with a fairly loose fit in the groove 74 the screw 53 of the FIG. 2 micrometer gauge.

For ease of insertion of the front end of the fixture between adjacent lands 60 of the FIG. 2 gauge, the combined vertical thickness of the plate 70 and block 71 is slightly less than the vertical spacing between the upper surface of each land 60 on the micrometer screw 53 (FIG. 2) and the lower surface of the land above. Such vertical thickness is supplemented by the upper parts of three ball bearings 80 seated at the top of block 71 in respective vertical holes 81 (FIG. 4) formed in the block and containing separate compression springs 82 urging the bearings 80 upwards. When the ball bearings 80 are under no downward pressure, the resilience of the springs 82 maintains a sufficient fraction of the upper hemisphers of the bearings above the top surface 83 of block 71 to produce a vertical height between the top of each bearing and the bottom surface 84 of plate 70 which is slightly greater than the mentioned vertical spacing between the top of each land 60 and the bottom of the next higher land. As shown, the three bearings 80 are horizontally disposed relative to each other at the three vertices of a triangle so as to form a three-part contact for the FIG. 1 fixture when its front end is inserted between two adjacent lands of the FIG. 2 gauge. Thus, the front end of the fixture with its pair of jaws 73 and its expandable bearings 80 may be said to provide holding head means for maintaining the bearing surface 84 of the front end in flat contact with the gauging surface of one of the lands.

The rear end 90a of plate 70 is in the shape of a semicircle which is intermittently cut away around its periphery to form therearound a set of tines 90b alternating with notches 90c intervening the tines. Above the plate end 90a are stacked nine circular steel gauging discs 91a–99a of which each is lapped with an accuracy to the sixth decimal place to be of 0.100000 inch axial thickness between optically flat, upper and lower surfaces of the disc. Each of the discs 91a–99a is peripherally cut away like the semi-circle 90a to have therearound a plurality of tines alternating with notches. The disc stack 91a–99a is affixed to its support 90a by an assembly comprised of (a) a hollow sleeve 100 passing through vertically aligned holes in the plate end 90a and the discs 91a–99a, (b) a pair of brass chrome-plate washers 101 at opposite ends of the sleve, and (c) a pair of machine screws 102 respectively received in the two washers 101 so that the heads of the screws are seated in countersinks in the washers, the stems of the screws passing through the washer holes into tapped opposite ends of the sleeve 100 to each be in threaded engagement with the sleeve. By tightening the screws 102, the discs of the stock 91a–99a are clamped together onto plate end 90a so that each disc is fixedly held in a selected angular position relative to the other discs and to the plate end 90a.

The end 90a is eccentric in relation to the hole therein through which sleeve 100 passes in that the center of the semicircular periphery of the end 90a is offset to the left (FIG. 4) of the axis of such hole. The center of each of discs 91a–99a is also eccentric in relation to the hole therethrough for shaft 100. When the plate end 90a and the discs 91a–99a are clamped together as described, the center of 90a is, as stated, offset from the shaft axis to be leftward thereof, the center of disc 91a is offset from said axis in the outward direction (i.e., towards the viewer of FIG. 4), and the center of disc 92a is offset from the shaft axis in the inward direction (i.e., away from the viewer in FIG. 4). That pattern of leftward-outward-inward for the direction of offset of the disc center from the sleeve axis is then cylically repeated for the higher discs 93a to 99a. Therefore, each of the elements 90a–99a has one tine which is more salient from the gauging stack than is any of the other tines of that element. That most salient tine is the leftward one for plate end 90a, the outward one for disc 91a, the inward one for disc 92a, the leftward one for disc 93a, and so on. Because the respective centers of the elements 91a–99a are offset from the sleeve axis in different directions in the manner which has been described, the most salient tine of any one of such elements is always spaced by a thickness of two discs (i.e., a thickness of 0.20000 inch) from the nearest other element whose most salient tine is vertically aligned with that of the one element. Hence, the arrangement of the elements constituting the stack 91a–99a is such as to provide ample room for bringing the bottom or top of the 0.125" diameter ball 37 (of the FIG. 3) gauge) into contact with the upper surface or the lower surface, respectively, of any one of the gauging elements in the stack.

As a supplementary way of providing such room for the ball, the arrangement of tines and notches on the stacked elements 90a–99a is such that one, some or all of the tines on each element (and especially the most salient tine) are in partly or wholly overlapping relation with notches on the next lower element (if any) and with notches on the next higher element (if any). Such overlapping relation is well shown in FIG. 1. By having each of the tines and notches on each gauging element occupy a relatively large angular width (i.e., by having relatively few tines and notches per element), and by arranging the respective tines and notches of the stacked elements 90a–99a such that tines on each element are in partly overlapping relation with notches of at least the next two lower elements and with notches of at least the next two higher elements, sufficient room can be provided solely by the tine-notch overlap for the bottom and top of ball 37 to contact the upper and lower surfaces, respectively, of a tines or tines on each of the elements 90a–99a. This being so, the eccentricity of the plate end 90a and the discs 91a–99a is no longer needed to make such room, and, accordingly, the true center of each of the elements 90a–99a may be made coincident with the axis of the sleeve 100. On the other hand, when the elements 90a–99a are eccentric and are stacked to have their centers appropriately offset in various directions from the sleeve axis, the tines and notches are not strictly necessary to make room for the ball 37. Thus, when the elements 90a–99a are eccentric and offset from the sleeve axis as described, a part or all of the tines and notches on each element may, if desired, be eliminated.

The FIG. 1 fixture is used in the manner shown in FIG. 4. That is, assuming as before that the FIG. 3 gauge has recorded by the direct procedure a height which is, in fact, 3.444 inches but which requires accurate measurement, the front part of the fixture is inserted between the "three inch" land 60b and the "four inch" land 60b of the FIG. 2 gauge so as to receive the micrometer screw 53 into the groove socket 74 of the fixture. When such is done, the front ends of the jaws 73 pass beyond the opposite side edges 56 of column 51 through the space between screw 53 and the inner wall surface of column 51 and into engagement with that inner wall surface. The screw 53 itself is clear all around.

As the forward part of the fixture is so slipped into the FIG. 2 gauge, the bottom surface 84 of the fixture slides over the upper surface 61b of the land 60b, and each of the spring-loaded ball bearings 80 is depressed as it comes into contact with land 60a to slide under that land and to roll over the lower surface thereof. When the fixture has been fully positioned in the micrometer gauge, the loading of the ball bearings 80 by the springs 82 maintains the lower surface 84 of the fixture in flat contact with the gauging upper surface 61b of the "three inch land" 60b.

It might be noted that the three 'inch" land 60b was chosen as the one above which the fixture would be inserted because it could be and was judged by eye that the land 60b is the one below the ball 37 of the FIG. 3 gauge which is nearest in height to the ball.

Once the fixture has been inserted into the FIG. 2 gauge, the FIG. 3 gauge is repositioned on the ground plane 40 to bring the ball 37 over the top of the most salient tine of that one of the gauging elements 90a–99a which is below the ball and nearest in height thereto. Which element that is can again be judged by eye. Because in the present instance the assumed height of ball 37 is 3.444 inches, the ball 37 is positioned over the top surface 93d of the disc 93 which is the fourth gauging element from the bottom in the stack 90a–99a. Since it has been assumed that the top surface 61b of land 60b is initially at a height of 3.000 inches, and since each of the gauging elements 90a, 91a, 92a and 93 has a vertical thickness of 0.10000 inch, it follows that the top surface 93d of tine 93b is initially at a height of 3.400 inches.

The micrometer head 54 is then revolved to rotate the screw 53 and the lands 60 in the direction which moves them vertically upward. Since the plate 70 of the fixture is in pressure contact with the top surface 61b of land 60b, the rotation of that land produces an angular movement of the fixture which brings one jaw 73 thereof into contact with one side of the column 51 of the FIG. 2. After the jaw so engages the side of the column, there is usually further rotation of the screw and land. Because, however, the three point contact provided by the ball bearings 80 maintains the bottom surface 84 of plate 70 in flat engagement with the top surface 61b of the supporting land 60b, any subsequent rotation of the screw 53 and the lands 60a and 60b does not produce binding or jamming of the screw by the fixture. Instead, during that subsequent rotation, the land surface 61b slides flatly under the plate surface 84, and the ball bearings 80 roll freely under the moving bottom surface of the land 60a.

The rotation of the head 54 is continued until the top surface 93d of tine 93b comes into contact with the bottom of ball 37 and (if necessary) raises that ball until the needle 36 of dial 35 (FIG. 3) indicates that the ball stem 33 is level. In other words, the surface 93d is elevated from its initially assumed level of 3.4000 inches to a dinal level (under the assumed conditions) of 3.444 inches, the rise being 0.044 inch in all. Since (it will be recalled) one full turn of the head 54 corresponds to $25/_{1000}$ inch vertical movement of the screw, such 0.044 inch rise in height is effected a full turn and a fraction of the micrometer head.

When the surface 93d of tine 93b reaches the described height at which it is in contact with ball 37 and stem 33 is level, the rotation of head 54 is discontinued and a reading of the attained height is taken. As before the "inches" figure is read from the vertical scale 55 on the column 51 of the FIG. 2 gauge such reading being "3." The tenths of an inch reading is not as before taken from the vertical scale 57 on the upper tube 52 of the FIG. 2 gauge. Rather, that last named reading is taken from the gauging stack 90a–99a of the FIG. 1, fixture, the reading being 0.4 because the ball 37 is in contact with the top face of disc 93a which is the fourth element up from the bottom of the stack. To facilitate such reading of the gauging stack, the separate gauging elements thereof may have impressed thereon the shown individual numbers (FIG. 1) of which each indicates the position of its associated element from the bottom of the stack. The reading is completed by observing on the scale 57 how many units of $25/_{1000}$ must be added to the measurement (in this instance, one such unit of 0.025) and by then observing from the scale 58 how many more one-thousandths must be added to complete the reading (in this instance, nineteen one-thousandths or 0.019). All of the obtained readings are then put together to give the figure of 3.444 which is the height which has been assumed in the present example.

By utilizing the FIG. 1 fixture in the manner described to provide the tenths of an inch reading, it has been possible during the measurement to rotate the head 54 through only slightly one full turn and a fraction as compared to the rotation of seventeen full turns and a fraction which would have been required in the same circumstances if the fixture had not been utilized. Thus, for most measured heights, the use of the fixture effects a substantial saving in the time and effort spent in the course of making the measurement. Specifically, the use of the fixture reduces the number of full turns of head 54 which are needed to make a measurement from perhaps forty or close to forty turns down to four turns at the most and down to two turns or less in the instance of repetitive measurements for which successive settings of the micrometer screw are close to each other.

Sometimes, it may be found that it is not convenient for the lands 60 to be initially located at heights of even inches above the ground plane. Instead it may be more convenient to initially locate, say, the "three inch" land 60b at 3.312 inches rather than at 3.000 inches. For use in such an instance, the FIG. 1 fixture has thereon a vertical scale 110 calibrated in tenths of an inch and adapted to register with the vertical scale 55 provided on column 51 of the FIG. 2 gauge. The scale 110 is employed by first noting the 1/10" marker thereof which has the same spacing from the bottom surface 84 of plate 70 as the surface of the gauging stack 90a–99a which is contacted by the ball 37. Then there is noted the 1/10" marker on scale 55 which is at the same height as the first-noted marker or is lower than the first-noted marker by less than one-tenth of an inch. That second-noted marker on scale 55 gives the correct "tenths of an inch" reading. Thus, if surface 61b of land 60b is initially at 3.312 inches and ball 37 is as before at 3.444 inches, the screw 53 will be raised 0.132 inch to bring the bottom of the ball into contact with the top surface of plate end 90a which is the #1 gauging element from the bottom, the corresponding #1 marker on scale 110 will be 0.044 inch above the #4 one-tenth inch marker on scale 55, and that last-named #4 marker gives the correct tenths of an inch reading for the measurement.

While the use of the FIG. 1 fixture has so far been described in connection with direct height measurements, it is as easily usable in making reverse measurements. That is, when the ball 37 of the FIG. 3 gauge has been employed to record a reverse height (e.g., the height s' in FIG. 3), such reverse height may be accurately measured by placing the ball 37 beneath the bottom face of the appropriate one of the most salient tines provided by stack 90a–99a, turning the micrometer head 54 to rotate the screw in the direction which moves that bottom face into contact with the ball, and so on. The manner of placing the ball against the fixture is represented in FIG. 4 by the dotted outline of ball 37 shown in contact with the lower face 93e of the most salient tine 93b of the disc 93a. In obtaining the reading for a reverse measurement it must be remembered the height value given to the bottom surface of one of the gauging elements 90a–99a is one-tenth of an inch less than that for the top surface thereof. Thus, the height value assigned for reading purposes to the surface 93e of disc 93a is 0.300 inch as compared to 0.400 inch for the top surface 93d of the same disc.

The described fixture is capable of making accurate reverse measurements as well as accurate direct measurements because the fixture, in effect, transforms a highly accurate reference level established by the top surface of one of the lands 60 on screw 53 into equally accurate reference levels established by undersurfaces on the fixture. Thus, for example, a height of 3.000 inches established by the top surface 61b of land 60b is converted into the same height of 3.000 inches established by the bottom surface 84 of plate 70 of the fixture, successively higher accurate "bottom surface" heights being established at 1/10 inch intervals above surface 84 by the undersurfaces of the discs 91a–99a above the plate.

In addition to the previously mentioned advantages of the fixture, it has the additional advantage of permitting a height recorded by the FIG. 3 gauge to be conveniently measured by the combination of the FIG. 2 gauge and fixture in the instance where the ball 37 is positioned in the vertical interval occupied (for a given setting of the screw) by the vertical thickness of a land 60 rather than by a space between two adjacent lands. Thus, for example, the fixture permits ready measurement where say the land 60b is at 3.000 inch but the height as recorded by ball 37 is 3.990 inches so that, in the absence of the fixture, either the "four inch" land 60a would have to be depressed below its normal height range of from 4.000 inches upwards (toward five inches) or the land 60b would have to be raised to the 3.990 inch level by a great many turns of the micrometer head 54.

The gauging elements of the stack 90a–99a may be lapped so that the thickness of each is accurate to whatever degree is required in order to obtain an accurate reading to a given decimal point. Thus, for example, if an extremely accurate reading is required, the gauging elements may approach Johannson blocks in the accuracy of the thickness to which each is lapped. Even where, however, an extremely accurate measurement is not required, I prefer to lap the thickness of each of the gauging elements 90a–99a to an accuracy two decimal places better than the last decimal point to be read in order thereby to minimize any cumulative error produced by the superposition in the stack 90a–99a of the individual gauging elements.

The above described embodiment being exemplary only, it is to be understood that additions thereto, omissions therefrom and modifications thereof can be made without departing from the spirit of the invention, and that the invention comprehends embodiments differing in form and/or detail from that specifically disclosed. Thus, for example, while the presence of nine discs in the stack of discs above plate end 90a is preferred, the top disc 99a of the nine may, if desired, be removed. Further, the washers 101 may be removed and the top and bottom screws 102 countersunk in, respectively, the top disc and the plate end 90a although to do so is not preferred because of the tendency of the countersinks in the top and bottom gauging elements to weaken them and thereby make them susceptible to deformation by the compressive forces exerted thereon by the screws 102 when tightened. Still further, the rigidity of the base for the FIG. 1 fixture may be increased by utilizing above plate 70 another gauging plate lapped with an accuracy of six decimal places to 0.10000 inch thickness and of an outline similar to plate 70 except that the notches of the rear semicircular end of the upper plate overlap with the tines of the plate end 90a of the lower plate 70. The front end of the fixture may be made in different sizes with respect to the dimensions of the groove 74 and the jaws 73 for the purpose of adapting the fixture to stepped micrometer gauges having screws of different diameter and/or otherwise differing in size. Moreover, the fixture evidently can be used with a height-recording instrument having as a dimension-indicating element a scriber or other device different from a ball.

Accordingly, the invention is not to be considered as limited save as is consonant with the recitals of the following claims.

I claim:

1. A gauging fixture for a gauge having an axial micrometer screw and a plurality of lands radially salient from said screw and axially spaced therealong by equal intervals measured between gauging faces respective to said lands and on sides thereof which are all towards the same end of said screw, said fixture comprising: support means having holding head means insertable between any pair of adjacent ones of said lands and axially expandable in the space between adjacent lands to maintain a bearing surface of said support means in flat contact with the gauging surface of one of said lands, said support means having a rear portion adapted to be held by said insertion radially outwards of said lands at a fixed angle in planes through said axis, and gauging means at the rear of said support means and comprised of a plurality of gauging elements disposed one after the other in the axial direction, said elements having gauging surfaces which are disposed on axially opposite sides of said elements to be facing in axially opposite directions, and which, when said rear portion is so held, are normal to said axis and are axially spaced by equal increments of a value smaller than said interval and integrally subdivisible into said interval, said oppositely facing surfaces being accessible from said opposite axial directions to a dimension-indicating tip of a measuring instrument.

2. A gauging fixture for a gauge having an axial micrometer screw and a plurality of lands radially salient from said screw and axially spaced therealong by equal intervals measured between gauging faces respective to said lands and on sides thereof which are all towards the same end of said screw, said fixture comprising, a base member having a front end and a rear end, means at the front end of said member for axial expansion in the space between adjacent lands to maintain a bearing surface of said front end in flat contact with the gauging surface of one of said lands to permit insertion of said front end between any pair of adjacent ones of said lands and to render said member held by said pair of lands at a fixed angle in planes through said axis such that said rear end is radially outward of said lands, a stack of axially superposed planar gauging elements of equal axial thickness supported by said member at the rear end thereof, each of said gauging elements providing respective parallel gauging surfaces which are operably normal to said screw axis, and which are each accessible from the same axial direction to a dimension-indicating tip means, and means to clamp together said stack of elements and the rear end of said base member.

3. A gauging fixture as in claim 2 in which said rear end of said member provides at least one gauging element in addition to those in said stack.

4. A gauging fixture as in claim 2 in which each gauging element has a portion which provides the gauging surface associated with that element, and which portion projects radially outward from said stack to be more salient therefrom than the vertically aligned portion of any contiguous element.

5. A gauging fixture as in claim 4 in which said more salient portion of each element in said stack is separated by the thickness of at least two elements from any vertically aligned more salient portion of any other element.

6. A gauging element as in claim 2 in which said elements provide a first plurality of gauging surfaces accessible from one axial direction and a second plurality of gauging surfaces accessible from the second axial direction.

7. A gauging element as in claim 2 in which said elements are in the form of gauging plates of which the periphery of each is scalloped to form a plurality of tines and intervening notches around said periphery.

8. A gauging element as in claim 2 in which said means at the front end of said member comprises, a mounting block and a plurality of spring-loaded ball bearings floatingly mounted in receptacles in said block to partly project axially outwards from one side thereof, said ball bearings being at the three vertices of a triangle.

9. A fixture as in claim 2 in which said means at the front end of said member comprises a pair of jaws on opposite sides of a groove adapted to receive said screw.

10. A gauging fixture for a gauge having an axial micrometer screw and a plurality of lands radially salient from said screw and axially spaced therealong by equal intervals measured between gauging faces respective to said lands and on sides thereof which are all towards the same end of said screw, said fixture comprising, a base member having at its front end a pair of jaws on opposite sides of a groove into which said screw is adapted to be received by insertion of said front end between a pair of adjacent lands on said screws, means mounted at said front end and adapted by resiliently expanding axially in the space between said adjacent lands to maintain one surface of said base member in flat contact with the gauging face of one of such lands, a stack of axially superposed planar gauging discs of equal axial thickness supported by the rear end of said member to be radially outward of said adjacent lands when the front end of said member is inserted therebetween, said gauging discs providing respective parallel gauging surfaces which are operably normal to said screw axis, and which are each accessible from the same axial direction to a dimension-indicating tip means, and means to clamp together said stack of discs and said rear end of said member, said last named means including a pin passing axially through vertically aligned holes respectively formed in said discs.

11. A fixture as in claim 10 in which the hole in each disc is eccentric in relation to the true center thereof, and in which the respective true centers of said discs are offset in various directions from the axis for said pin such that in said stack the offset direction for any one disc is different from that of any contiguous disc and any disc next to such contiguous disc.

12. A fixture as in claim 10 in which esach disc is characterized around its periphery by a plurality of tines and intervening notches, and in which tines of any one disc are in at least partly overlapping relation with notches of any contiguous disc.

13. An accessory for a reference height gauge of the type having a base, a bar having a plurality of rings thereabout equally spaced a unit of measurement apart along said bar, said rings providing reference surfaces perpendicular to the axis of said bar, and a micrometer for moving said bar up and down; comprising a fork, means for attaching said fork to one of said rings against the reference surface thereof, and a columnar scale secured to said fork to be parallel to said bar when said fork is attached to a ring, said scale being at least a unit long and having a plurality of equally spaced ears extending transversely therefrom providing reference surfaces of which ones are on opposite sides of said ears to be facing in opposite directions along said scale, and which subdivide said unit individually, and said ears being disposed one after the other along said scale to render said oppositely facing surfaces accessible from said opposite directions to a dimension-indicating tip of a measuring instrument.

References Cited by the Examiner

UNITED STATES PATENTS 2,536,401   1/1951   Victor _____ 33—168
2,831,256   4/1958   Werle _____ 33—168

LEONARD FORMAN, *Primary Examiner.*

ISAAC LISANN, *Examiner.*

W. K. QUARLES, F. H. THOMSON,
                              *Assistant Examiners.*